Dec. 15, 1964    E. EBDON ETAL    3,161,383
FLYING CONTROL SYSTEM FOR AIRCRAFT
Filed May 25, 1962    3 Sheets-Sheet 1

Eric Ebdon
Kenneth David Harris
Inventors

By
Stevens, Davis, Miller & Mosher Attorneys

Eric Ebdon
Kenneth David Harris
Inventors
By
Stevens, Davis, Miller & Mosher Attorneys

3,161,383
FLYING CONTROL SYSTEM FOR AIRCRAFT
Eric Ebdon, Caddington, near Luton, and Kenneth David Harris, Flitwick, England, assignors to Power Jets (Research and Development) Limited, London, England, a British company
Filed May 25, 1962, Ser. No. 197,686
Claims priority, application Great Britain May 29, 1961
2 Claims. (Cl. 244—83)

This invention relates to flying control systems for aircraft, and in particular, aircraft operating on the "jet flap" principle.

In a jet flap aircraft, jet streams are discharged rearwardly from the rearward direction. The jet sheets have and provision is made for deflecting the jet sheets downwardly from the rearward direction. The jet sheets have an effect analogous to that of conventional trailing edge wing flaps, and downward deflection of the jet sheets produces a substantial increase in wing lift. At the same time however a large nose-down pitching moment on the aircraft is set up. This is counteracted at least to some extent by an increase in downwash on the aircraft tailplane, but it is usually necessary in addition to reduce the incidence of or to apply negative incidence to the tailplane or the elevators or both.

When however a jet flap aircraft is near the ground with the jet sheets deflected downwardly, for example, on coming in to land, a further complication arises due to impingement of the jet sheets on the ground. Under these circumstances it is found that the downwash on the tailplane is lost, and hence it is necessary to make additional provision for counteracting the nose-down pitching moment caused by the jet sheets. In the present invention this is done by a particular inter-relation of the movements of the tailplane and the elevators in accordance with the movement of the pilot's control column.

Accordingly the invention provides an aircraft flying control system comprising a pilot's control column connected to adjust the incidence of both the aircraft tailplane and the elevators mounted thereon, wherein the connection between the column and the tailplane is such that the rate at which the tailplane incidence is adjusted in response to movement of the column varies over the range of movement of the latter, being greatest at the end of the range corresponding to algebraically minimum tailplane and elevator incidence.

The rate of adjustment of the tailplane incidence may increase continuously over the range of the movement of the column.

Thus when coming in to land, a large increase in nose-up pitching moment can be applied to the aircraft by moving the control column to the limit of its range of movement. This increase counteracts the nose-down pitching moment caused by downward deflection of the jet sheets and replaces the nose-up pitching moment due to downwash on the tailplane which is lost close to the ground.

The rate at which elevator incidence is adjusted in response to movement of the column may also increase over the range of movement of the column, the rate of increase being less than that of tailplane incidence.

Under some flying conditions, particularly in low speed flight, the aerodynamic forces which can be exerted by the tailplane and elevators may be insufficient for control of the aircraft. According to a feature of the invention therefore there is provided at least one fluid discharge nozzle arranged to discharge fluid in such a direction as to exert a pitching moment on the aircraft, the moment being variable by movement of the control column. In one form of the invention, two such nozzles are provided at the rearward extremity of the aircraft, one being directed upwardly and the other downwardly, and the column is connected to vary the discharge areas of the two nozzles in opposite senses. The connection is preferably such that over the major part of the range of movement of the control column the nose-up pitching moment exerted by the streams is increased with algebraically reduced incidence of the tailplane and elevators, while over that end of the range previously referred to the discharge areas and the resultant pitching moment are maintained constant.

One embodiment of the invention will now be described by way of example with reference to the accompanying diagrammatic drawings, of which:

Figure 1:
FIGURE 1 is a side view of a jet flap aircraft.
Figure 2:
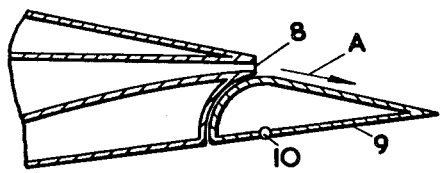
FIGURE 2 is a sectional view through the rear part of one wing of the aircraft.

The aircraft of FIGURE 1 comprises a fuselage 1, wings 2, fin 3 and rudder 4, and a tailplane 5 mounted high on the fin. The tailplane carries elevators 6 and is itself pivotable on the fin about a horizontal axis 7. The aircraft is powered by one or more gas turbine jet propulsion engines connected to discharge propulsive jet streams through nozzles 8 in the wings—see FIGURE 2. These nozzles are long and shallow and extend along practically the full span of each wing so that the jet streams are discharged rearwardly as long thin jet sheets. The wings carry trailing edge wing flaps 9 which also extend along practically the full span of each wing, and the nozzles are arranged to discharge the jet sheets over the upper surfaces of the flaps as indicated by arrow A. By turning the flaps about their pivotal axes 10, the jet sheets can be deflected upwardly and downwardly from the rearward direction to vary the wing lift. It is to be noted that the flaps can be operated differentially to act as ailerons and together to act as flaps.

Figure 3:
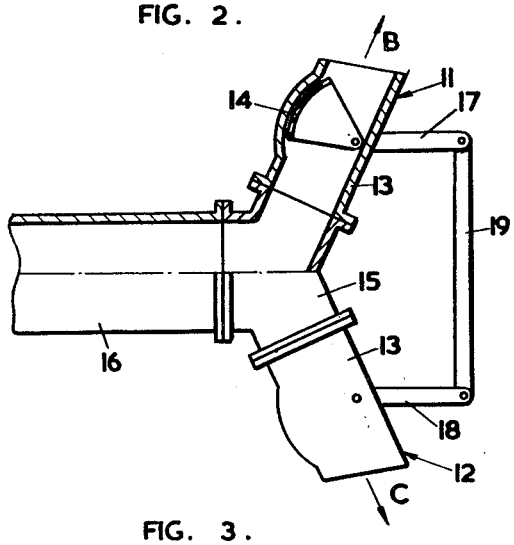
FIGURE 3 is a part sectional view of the pitch control nozzles of the aircraft.

The aircraft is also provided with small pitch control nozzles 11, 12. These are mounted at the rearward extremity of the aircraft and are arranged to discharge upwardly and downwardly respectively as indicated by arrows B, C. The construction of the nozzles is shown in FIGURE 3; each nozzle consists of a rectangular section duct 13 provided with a pivotted shutter 14 whereby the nozzle discharge area can be varied. The nozzles 11, 12 are mounted on a T piece 15 attached to the end of a duct 16 which supplies them with gases bled from the engine efflux or compressed air bled from the engine compressor or compressors. The streams discharged by these nozzles exert a pitching moment on the aircraft, the moment being variable by variation of the nozzle discharge areas. The shutters of the two nozzles are linked by levers 17, 18 and rod 19 so that the discharge areas of the nozzles are varied in opposite senses.

Figure 4:
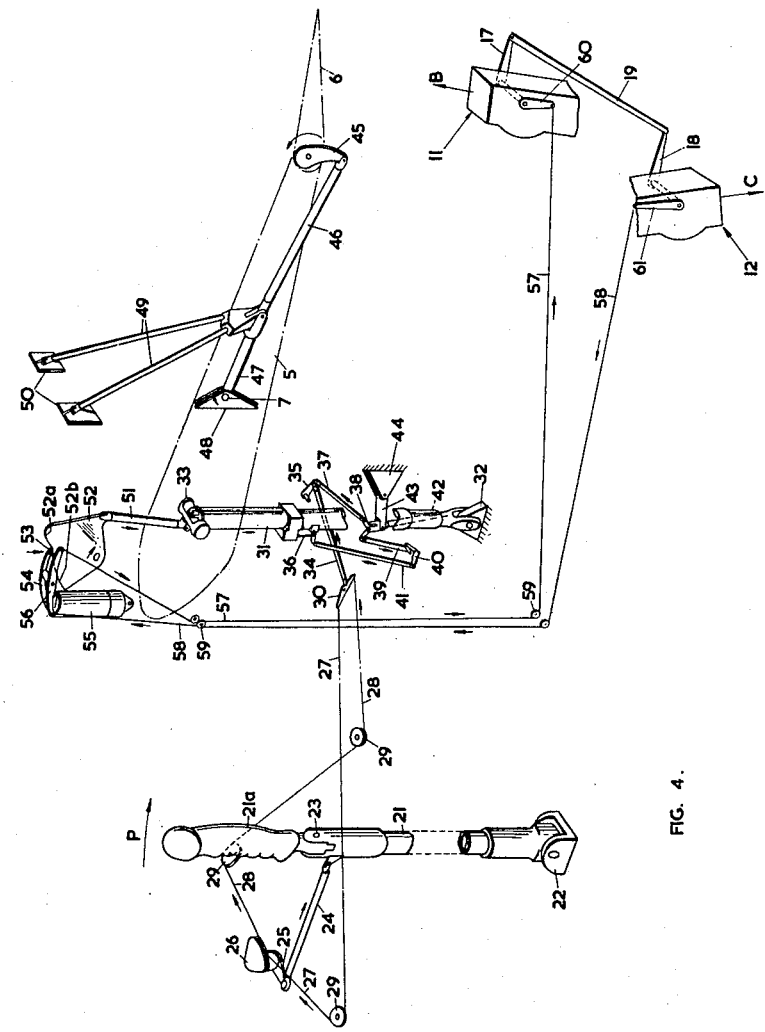
FIGURE 4 is a schematic view of the aircraft flying control system.

Referring now to FIGURE 4, the flying control system includes a pilot's control column 21 pivotally mounted at its foot in a fixed support bracket 22 for movement in a fore and aft sense. The handle part 21a of the column can also be turned in a transverse plane about a pivot 23 and is connected to the flaps 9 in such a way that they can thereby be operated differentially as ailerons, but this part of the system is not shown as it forms no part of the present invention. The column is connected through a push rod 24 and a lever 25 to turn a spool 26 around which are looped cables 27, 28. These cables pass around pulleys 29 and are connected at their ends to opposite ends of a lever 30 pivotally mounted at its mid-point on a horizontal transverse axis within the fin.

The tailplane incidence is adjustable by means of a hydraulic jack 31 pivotally attached at its lower end to an anchorage 32 on the aircraft structure and at its upper end to a bracket 33 within the tailplane. Lever 30 is connected through a push rod 34 to a lever 35 which is connected to operate the servo valve 36 of the jack through a linkage consisting of push rod 37, bell crank lever 38, push rod 39, crank lever 40 and push rod 41. The bell crank lever 38 is pivotally mounted on the upper end of a link 42 pivotally attached at its lower end to the anchorage 32. The link 42 is restrained against pivotal movement by a further link 43 connected to a bracket 44 on the aircraft structure.

Adjustment of elevator incidence is effected by its connection to the tailplane. The elevator operating arm 45 is connected through a link 46 to the apex of a tripod formed by legs 47, 49 which are in turn pivotally connected at their other ends to brackets 48, 50 respectively on the aircraft fin spar.

Figure 5:
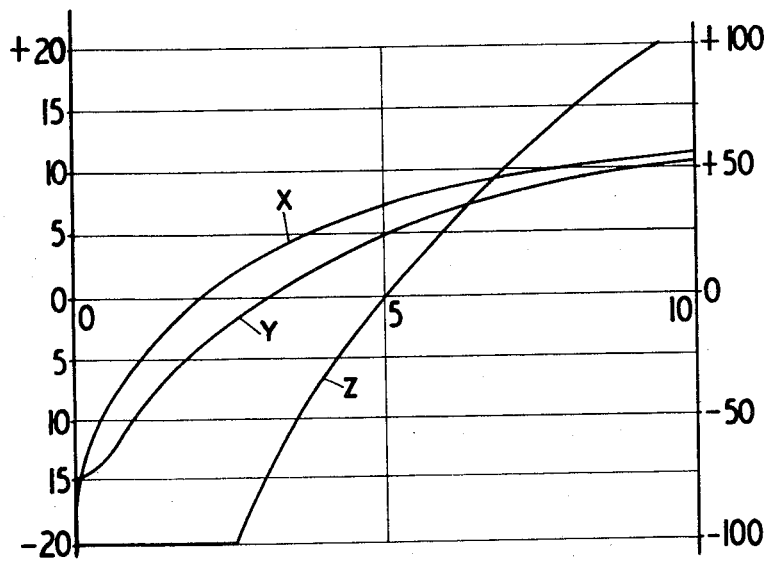
FIGURE 5 is a graph showing the variation with the movement of the pilot's control column of the tailplane and elevator incidence and of the pitching moment effected by the pitch control nozzles.

The variation of tailplane and elevator incidence with movement of the control column is shown in the graph of FIGURE 5. In this graph movement of the column is plotted horizontally on an arbitrary scale, the left hand end of the scale representing the maximum rearward movement of the column (in the direction of the arrow P in FIGURE 4) while the left hand scale represents incidence in degrees, and curves X and Y represent tailplane and elevator incidence respectively. The linkage 37–41 is so contrived that rate of adjustment of the tailplane incidence increases continuously over the range of movement of the column towards the "stick back" position, so that the rate is greatest at the end of the range corresponding to algebraically minimum, i.e. negative, incidence of the tailplane and elevator (see curve X). The variation of elevator incidence is dictated by the linkage 45–50, and it will be seen from curve Y that the rate of adjustment also increases continuously in the same sense as that of tailplane incidence, though the rate of increase is less.

It will be seen therefore that when the aircraft is coming in to land (in which case the column will already be towards the "stick back" end of its range of movement) a relatively small additional movement to the end of the range will produce a rapid algebraic reduction in incidence, i.e. increase in negative incidence, whereby a large nose up pitching moment is produced to compensate for the loss of downwash on the tailplane close to the ground.

The control column 21 is also connected to operate the pitch control nozzles 11, 12. The tailplane bracket 33 is connected through a push rod 51 to turn a cam 52 pivotally mounted on a horizontal transverse axis. A follower 53 is carried on the end of a lever 54, the follower being urged into contact with the cam surface by a spring box 55 connected to the other end of the lever. A second lever 56 is fast with the lever 54 and cables 57, 58 are connected to its ends. These cables pass around pulleys 59 and have their other ends connected to operating arms 60, 61 for the shutters 14 of the nozzles 11, 12.

The variation in the nozzle areas is such as to produce the variation in pitching moment represented by the curve Z in the graph of FIGURE 5 where the right hand scale represents percentage pitching moment, positive values representing a nose-down moment. With the column in the "stick forward" position, the upwardly directed nozzle 11 is fully closed while the downwardly directed nozzle 12 is fully open so that the nose-down pitching moment is a maximum. As the column is moved rearwardly, the jack 31 is retracted and the follower 53 travels over the cam surface which is shaped at 52a so that nozzle 11 is opened and nozzle 12 closed and the continuous variation of pitching moment represented by curve Z in FIGURE 5 is effected over the major part of the range of movement of the control column. The remainder of the surface of the cam however is shaped at 52b as a dwell whereby for movement of the control column over the final part of its range, corresponding generally to the large increase in negative incidence of the tailplane, the pitching moment set up by the discharge from the nozzles 11, 12 is maintained unchanged at its maximum nose-up value represented by the horizontal part of the curve Z in FIGURE 5.

It would be possible to counteract the large nose-down pitching moment due to loss of downwash by increasing the nose-up pitching moment afforded by the pitch control nozzles. However the required moment can be applied by increase of negative incidence of the tailplane, and so in the interest of economy the power of the pitch control nozzles is limited to that required for control in flight away from the ground. It will be noted that the control column is moved over the extreme "stick-back" portion of its range only at take-off and landing at high lift coefficients close to the ground.

It will be seen that the pitch control system of the aircraft is entirely power operated, the jack 31 acting directly on the tailplane and indirectly on the elevators and the pitch control nozzles. Spring feel is therefore built into the system but this is not shown as it forms no part of the present invention. The mounting of the bell crank lever 38 on the link 42, which is in turn mounted on the anchorage 32, ensures that loads on the elevators will not act back through the mechanism onto the control valve 36 to adjust the jack.

We claim:

1. In an aircraft comprising a fin, an adjustable incidence tailplane pivotable on the fin and elevators pivotally attached to the tailplane; a flying control system comprising a pilot's control column, a jack connected at one end to the aircraft fixed structure and at the other end to the tailplane so as to adjust the incidence of the tailplane and having a servo-valve, a linkage connecting the column to the servo-valve in such a way that the rate at which tailplane incidence is adjusted in response to movement of the column varies over the range of movement of the column being greatest at the end of the range corresponding to algebraically minimum tailplane incidence, and a linkage connecting the elevators to the fin, the linkage consisting of an operating arm connected through a link to the apex of a tripod formed by legs pivotally connected at their other ends to brackets on the fin spar, so that elevator incidence is adjusted in dependence upon tailplane incidence.

2. The combination of claim 1, wherein the aircraft further comprises two fluid discharge nozzles and means for supplying fluid to said nozzles, one nozzle being directed upwardly and one downwardly and the nozzles being located so that the fluid streams discharged thereby exert a pitching movement on the aircraft and wherein also the tailplane is connected to the nozzles to vary the fluid discharge therefrom in opposite senses and in such a way that the nose-up pitching moment exerted by the fluid streams is increased as the incidence of the tailplane is adjusted towards its algebraic minimum.

References Cited in the file of this patent

UNITED STATES PATENTS

| | | |
|---|---|---|
| 2,563,757 | Thorp | Aug. 7, 1951 |
| 2,596,242 | Hill | May 13, 1952 |
| 2,840,323 | Hood et al. | June 24, 1958 |
| 2,978,207 | Davidson | Apr. 4, 1961 |

FOREIGN PATENTS

| | | |
|---|---|---|
| 1,150,433 | France | Aug. 12, 1957 |